US009421498B2

(12) United States Patent
Sakamoto et al.

(10) Patent No.: US 9,421,498 B2
(45) Date of Patent: Aug. 23, 2016

(54) SYSTEMS AND METHODS FOR CONDITIONING A FILTER ASSEMBLY

(71) Applicant: Pall Corporation, Port Washington, NY (US)

(72) Inventors: Atsushi Sakamoto, Tsukuba (JP); Hisayuki Kataoka, Kashiwa (JP); Takehito Mizuno, Omitama (JP); Kazuma Tsutsumi, Ushiku (JP)

(73) Assignee: Pall Corporation, Port Washington, NY (US)

( * ) Notice: Subject to any disclaimer, the term of this patent is extended or adjusted under 35 U.S.C. 154(b) by 338 days.

(21) Appl. No.: 13/674,356

(22) Filed: Nov. 12, 2012

(65) Prior Publication Data

US 2014/0131278 A1    May 15, 2014

(51) Int. Cl.
*B01D 65/02* (2006.01)
*B01D 41/04* (2006.01)
*A61M 1/16* (2006.01)

(52) U.S. Cl.
CPC ............... *B01D 65/02* (2013.01); *B01D 41/04* (2013.01)

(58) Field of Classification Search
CPC ........ B01D 65/02; B01D 41/04; B01D 35/12; B01D 35/16; B01D 35/30
USPC ......... 210/637, 791, 106, 108, 109, 120, 472, 210/416.1, 418
See application file for complete search history.

(56) References Cited

U.S. PATENT DOCUMENTS

| 4,282,105 | A | 8/1981 | Crowe |
| 5,281,344 | A | 1/1994 | Miller et al. |
| 5,494,591 | A | 2/1996 | Stamm et al. |
| 5,733,441 | A | 3/1998 | Ko et al. |
| 5,762,789 | A * | 6/1998 | de los Reyes ........ B01D 36/001 210/288 |
| 6,846,409 | B2 * | 1/2005 | Laverdiere ......... B01D 19/0031 210/188 |
| 7,029,238 | B1 | 4/2006 | Zagars et al. |
| 7,654,414 | B2 | 2/2010 | Hiranaga et al. |
| 7,967,978 | B2 | 6/2011 | Bright et al. |
| 2004/0094463 | A1 * | 5/2004 | Laverdiere ......... B01D 19/0031 210/188 |
| 2006/0249023 | A1 | 11/2006 | Pranda et al. |
| 2007/0107601 | A1 * | 5/2007 | Laverdiere ......... B01D 19/0031 96/219 |
| 2008/0230492 | A1 | 9/2008 | Kao et al. |

FOREIGN PATENT DOCUMENTS

| WO | WO 94/27707 A1 | 12/1994 |
| WO | WO 97/04852 A2 | 2/1997 |
| WO | WO 00/72936 A1 | 12/2000 |

OTHER PUBLICATIONS

Umeda, Toru; "*Solvent pre-wetting as an effective start-up method for point-of-use filter*," Society if Photo-Optical Instrumentation Engineers, 8 pgs (2012).

* cited by examiner

*Primary Examiner* — Allison Fitzsimmons
(74) *Attorney, Agent, or Firm* — Leydig, Voit & Mayer

(57) ABSTRACT

Systems and methods condition a filter assembly. Purging liquid is passed through the filter assembly to remove contaminants from the pores and voids of the filter medium and from the upstream and downstream sides of the filter medium.

2 Claims, 2 Drawing Sheets

SYSTEMS AND METHODS FOR CONDITIONING A FILTER ASSEMBLY

DISCLOSURE OF THE INVENTION

The chemicals used in many industries, including the microelectronics industry and the pharmaceutical industry, must be extremely pure. Very fine filtration of these chemicals is required, often at the point of use, to remove any contaminants that might disrupt the processes used, or ruin the products made, by these industries. Generally, the filter assemblies used to filter these chemicals have a permeable filter medium. The chemical will pass through the filter medium, and any contaminants in the chemical will be trapped within or on the surface of the filter medium.

Before a chemical is filtered, systems and methods embodying the invention condition the filter assembly and prevent the filter assembly itself from introducing contaminants into the chemical. Generally, a purging liquid is flushed through the filter assembly to remove any contaminants that might be contained within the filter assembly, even a newly manufactured filter assembly. The purging liquid may be any liquid that is compatible with the chemical to be filtered. For less toxic or less expensive chemicals, the purging liquid may be the chemical itself. More often, the purging liquid may be a less toxic or less expensive liquid component of the chemical or a liquid solvent for the chemical. As the filter assembly is flushed, the purging liquid may displace any gas within the filter assembly and carry away any gas and other contaminants contained in the filter assembly. After flushing, the conditioned filter assembly, filled with the purging liquid, may be stored and/or shipped, and it may be used to filter the chemical after the purging liquid is removed from the filter assembly.

SUMMARY OF THE INVENTION

Systems and methods embodying the invention may be used to condition filter assemblies one at a time or several at once. Each filter assembly may include a filter medium, an inlet, a vent, and an outlet. The filter medium may have an upstream side and a downstream side within the filter assembly. The inlet and the vent may be on the upstream side of the filter medium, and the outlet may be on the downstream side of the filter medium.

In accordance with one aspect of the invention, methods for conditioning a filter assembly may comprise opening an inlet of a filter assembly, filling an upstream side of the filter medium within the filter assembly with a purging liquid, and filling the filter medium and the downstream side of the filter medium within the filter assembly with a purging liquid. The methods may also comprise closing the inlet and applying a vacuum to an open outlet while the inlet is closed to condition the filter assembly.

In accordance with another aspect of the invention, systems for conditioning a filter assembly may comprise a purging liquid supply, a vacuum device, an inlet valve, and a controller. The purging liquid supply may be coupleable to an inlet of a filter assembly, and the vacuum device may be coupleable to at least an outlet of the filter assembly. The inlet valve may be operable to open and close the inlet of the filter assembly, and the controller may be connected to at least the vacuum device and the inlet valve. The controller may be operable to open the inlet valve and supply purging liquid from the purging liquid supply through the open inlet to fill the upstream side of the filter medium, the filter medium, and the downstream side of the filter medium within the filter assembly with purging liquid. The controller may also be operable to close the inlet valve and actuate the vacuum device to apply a vacuum to an open outlet of the filter assembly filled with purging liquid.

Methods and systems embodying these aspects of the invention have many advantageous features, including, for example, features that are highly effective for removing any contaminants from the filter assembly before the filter assembly is used to filter any chemicals. For example, by filling the filter assembly, including the upstream side of the filter medium, the filter medium itself, and the downstream side of the filter mediums, with purging liquid, methods and systems embodying the invention ensure that the filter assembly is thoroughly flushed by the purging liquid. Contaminants, including gas such as air, in the interior of the filter assembly are displaced and/or carried away by the purging liquid, leaving the filter assembly largely free of contaminants. Further, by applying a vacuum to the open outlet while the inlet is closed, any remaining contaminants, especially any gas trapped in the pores and voids of the filter medium or entrained in the purging liquid, are quickly and effectively removed via the open outlet by the vacuum. For many embodiments, both the outlet and the vent may be opened while the inlet is closed, and the vacuum device may apply the vacuum to both the open outlet and the open vent to even more quickly and effectively remove any remaining gas in the filter assembly.

In accordance with another aspect of the invention, methods for conditioning a filter assembly may comprise conditioning a filter assembly by 1) passing purging liquid through an open inlet, along an upstream side of a filter medium, through an open vent of the filter assembly to a waste reservoir and 2) passing purging liquid through an open inlet, through the filter medium, along the downstream side of the filter medium, through an open outlet of the filter assembly to a waste reservoir. The methods may also comprise replacing the conditioned filter assembly with a second assembly having a similar inlet, outlet, and vent, closing the inlet of the second assembly, and passing the purging liquid from the waste reservoir to the second assembly through at least one of an open outlet and an open vent of the second assembly.

Methods embodying this aspect of the invention also have several advantageous features. For example, by passing the purging liquid from the waste reservoir into the second assembly, the purging liquid waste may be neatly and safely contained within the second assembly. The inlet, outlet, and vent of the second assembly may be sealed, and the sealed second assembly containing the purging liquid waste may be appropriately disposed of, e.g., incinerated, without exposing either the environment or any service personnel to any hazardous substances.

DESCRIPTION OF EMBODIMENTS

Systems for conditioning filter assemblies in accordance with one or more aspects of the invention may be embodied in any of numerous ways and may be used to condition any of a great variety of filter assemblies, either one filter assembly at a time or a plurality of filter assemblies all at once.

Figure 1:
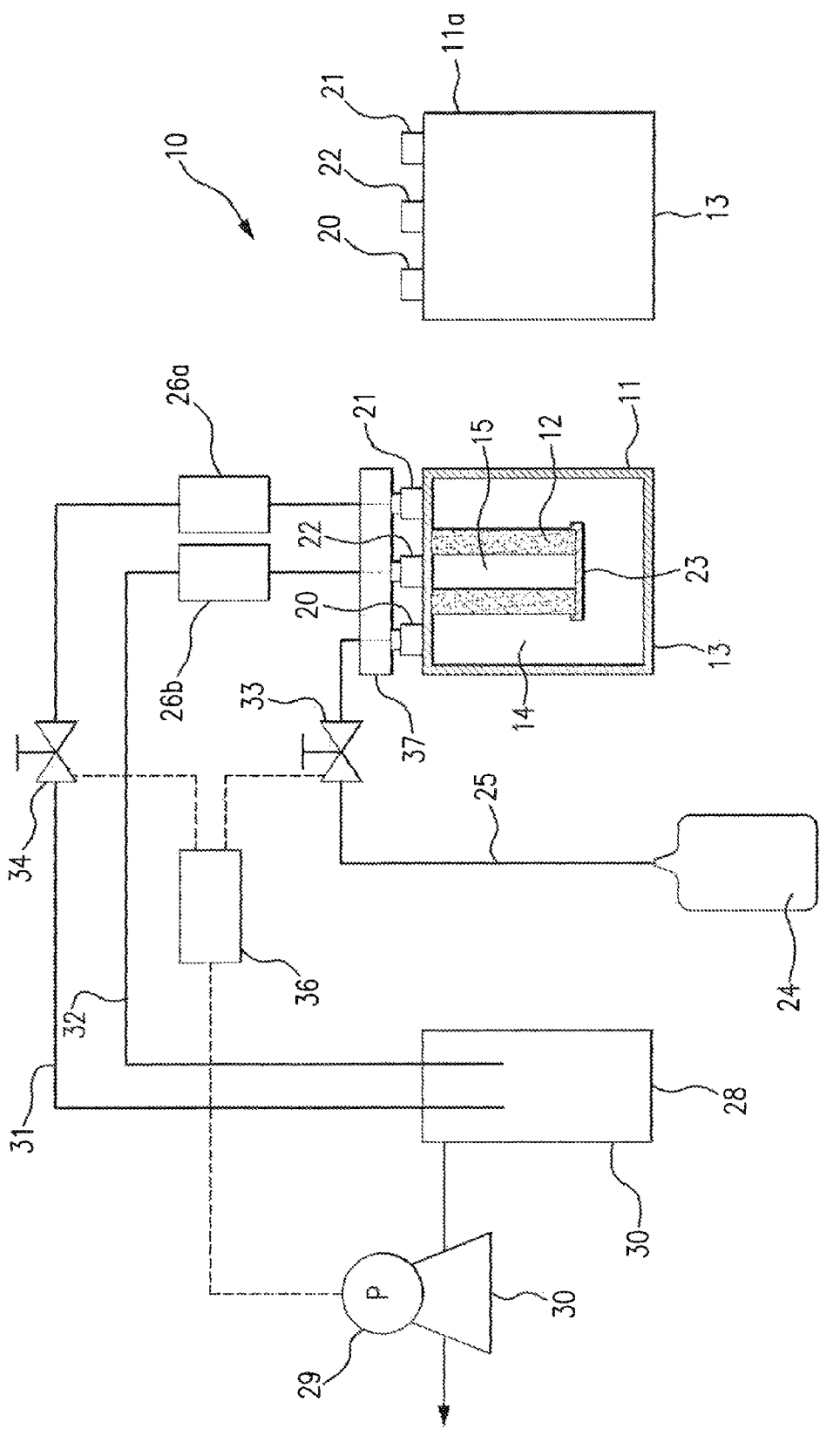
FIG. 1 is a schematic view of an embodiment of a system for conditioning a filter assembly.

Each filter assembly may be variously configured. As shown in FIG. 1, each filter assembly 11 may include a filter medium 12 for removing contaminants from a liquid chemical used in an industrial process. For many of these industries, e.g., the microelectronics industry and the pharmaceutical industry, the chemical must be extremely pure. Consequently, the filter medium may have a removal rating in the microporous or nanoporous range. For example, the removal rating may be down to about 0.05 microns or less than 0.05 microns, including about 40, 30, 20, 10, or 5 nanometers or less. The filter may, for example, be formed from a permeable metallic material, a permeable ceramic material, or a permeable polymeric material, including a permeable polymeric membrane or a permeable sheet or mass of polymeric fibers or filaments. Further, the filter medium may have, for example, a flat, honeycomb, pleated, or spirally wound structure.

The filter assembly 11 may further include a housing 13 which encloses the filter medium 12, and the filter medium 12 may define an upstream side 14 and a downstream side 15 within the filter assembly 11. Before conditioning, the filter assembly 11, including the pores and voids within the filter medium 12, may be filled with gas, e.g., air or an inert gas such as nitrogen. The filter assembly 11 may further include an inlet 20 and a vent 21 on the upstream side 14 of the filter medium 12 spaced from one another and an outlet 22 on the downstream side 14 of the filter medium 12. The inlet, the vent, and the outlet may be positioned at various locations on the filter assembly, including the top, bottom, and/or sides. In the illustrated embodiment, the inlet 20, the vent 21, and the outlet 22 may each be on top of the housing 13. The housing 13 may define one or more flow paths within the filter assembly 11, e.g., between the inlet 20 and the vent 21 and between the inlet 20 and the outlet 22. For many embodiments, the filter medium 11 may have a hollow, generally cylindrical configuration, and a blind end cap 23 may be joined to one end of the filter medium 12. The filter assembly 11 may be arranged for outside-in flow from the upstream side 14 of the filter assembly 11 on the exterior of the filter medium 12 to the downstream side 15 of the filter assembly 11 on the interior of the filter medium 12. Alternatively, the filter assembly may be arranged for inside-out flow. Many different filter assemblies may be conditioned by systems and methods embodying the invention, including filter assemblies available from Pall Corporation of Port Washington, N.Y., USA, for example, under the trade designation EZD.

One of many different examples of an embodiment of a conditioning system 10 is also shown in FIG. 1. The conditioning system 10 may include a purging liquid supply 24 which may be coupleable to the inlet 20 of the filter assembly 11 in a variety of ways. For example, an inlet line 25 may extend between the purging liquid supply 24 and the inlet 20 of the filter assembly 11. The conditioning system may also include a waste reservoir coupleable to the vent and the outlet of the filter assembly in any of a variety of ways. For example, the waste reservoir may be a single reservoir coupled to both the vent and the outlet. Alternatively, the waste reservoir may include a vent waste reservoir 26a coupled to the vent 21 and separate outlet waste reservoir 26b coupled to the outlet 22. For example, the vent waste reservoir 26a may be coupled to a vent line 31 extending from the vent 21, and the outlet waste reservoir 26b may be coupled to an outlet line 32 extending from the outlet 22. The conditioning system 10 may also include a vacuum device 30 coupled at least to the outlet 22 of the filter assembly 11 for applying a vacuum to the outlet 22. For many embodiments, the vacuum device 30 may be coupled to both the outlet 22 and the vent 21 and may apply a vacuum to both the outlet 22 and the vent 21. The conditioning system 10 may further include an inlet valve 33 and a vent valve 34. The inlet valve 33 and the vent valve 34 may be operatively associated with the inlet 20 and the vent 21, respectively, of the filter assembly 11 to open and close the inlet 20 and the vent 21. For some embodiments, the conditioning system may also include an outlet valve operatively associated to the outlet of the filter assembly to open and close the outlet. For other embodiments, including the illustrated embodiment, no outlet valve may be included. Although the conditioning may be done manually, for most embodiments, the conditioning system 10 may additionally include a controller 36 connected to one or more of the components to control the conditioning of the filter assembly 11. For example, in the conditioning system 10 of FIG. 1, the controller 36 may be connected to the vacuum device 30, the inlet valve 33 and the vent valve 34.

The components of the conditioning system 10 may be configured in any of numerous ways. For example, the purging liquid supply may be variously configured, for example, as a tank or drum holding a large amount of purging liquid or a smaller container, including a flexible container, that contains a smaller amount of purging liquid. Various containers for supplying purging liquid may be suitable, including many of the containers, reservoirs, and bags containing dispense liquid as identified in United States Patent Application Publication No. US 200510173458 A1. Any of numerous purging liquids may be contained in the purging liquid supply. A purging liquid may be any liquid compatible with the chemical to be filtered by the filter assembly, including the chemical itself, one or more components, e.g., the principal or base component, of the chemical, or a solvent for the chemical or the component(s). The chemical and the purging liquid may vary depending, for example, on the desired process within the industry. For example, in the photolithography industry, the chemical to be filtered may be a photoreactive chemical, such as a photoresist, an antireflecting coating, or any other chemical intended to be dispensed on a substrate wafer. For many embodiments, the purging liquid may be solvent for these dispensable chemicals. Examples of such solvents include, but are not limited to, ethyl (S)-2-hydroxypropanoate, 1-methoxy-2-propyl acetate, cyclohexanone, butyl acetate, dihydrofuran-2(3H)-one, and 1-methoxypropan-2-ol.

The waste reservoir 26a, 26b may be configured in a variety of ways to receive contaminated purging liquid from the filter assembly 11 as it is being conditioned. For example, each waste reservoir 26a, 26b may be a fixed or flexible container for receiving and containing any contaminated purging liquid that exits the filter assembly via the outlet or vent.

The vacuum device 30 may be configured in any of numerous ways and may be variously coupled to the outlet 22 or the vent 21 of the filter assembly 11. For example, for some embodiments the vacuum device may include eductor mechanism that generates a vacuum which is applied to at least the outlet. For other embodiments, the vacuum device 30 may include a sealed chamber 28 and a vacuum pump 29 coupled to the sealed chamber 28 to evacuate the chamber 28 and generate a vacuum within the chamber 28. The vacuum chamber 28 may be coupled to the outlet 22, e.g., via the outlet line 32, and may apply the vacuum to the outlet 22. The vacuum chamber 28 may also be coupled to the vent 21, e.g., via the vent line 31, and may apply the vacuum to the vent 21. Alternatively the vacuum chamber may be coupled only to the outlet.

Any of numerous valves are suitable for the inlet valve 33, the vent valve 34, and any outlet valve. One or more of the valves may be a variable flow valve and may be used to control fluid flow to and/or from the filter assembly. For many embodiments, however, the valves may be binary on/off valves, for example, fast acting on/off valves, and fluid flow may be controlled by the vacuum device 30. Each valve may be located in a variety of positions to open and close the inlet, vent, or outlet of the filter assembly. For example, the inlet valve 33 may be located in the inlet line 25 and the vent valve 34 may be located in the vent line 31.

The controller 36 may be configured in any of a variety of ways. For example, the controller 36 may be an electronic controller and may include, for example, a microprocessor or a logic array, e.g., a programmable logic array, for implementing the various steps involved in conditioning the filter assembly. The controller may be a separate unit and may be physically located with the remainder of the conditioning system or any of the other components of the conditioning system. Alternatively, the controller may be integrated with a larger electronic system for controlling one or more processes, e.g., the dispense processes, in addition to conditioning the filter assembly. The controller may be connected to any of the components of the conditioning system to receive and/or send information about the system and/or to regulate the functions of one or more components of the conditioning system. For example, the controller 36 shown in FIG. 1 may be connected to the vacuum device 30 to control the flow of purging liquid from the purging liquid supply 24 to the inlet 20 of the filter assembly 11. The controller 36 may also be connected to the inlet valve 33 and the vent valve 34 to open and close the valves and control flow through the inlet 20 and vent 21 of the filter assembly 11.

The conditioning system may include one or more additional components, including, for example, sensors, such as pressure sensors, temperature sensors, flow sensors, and level sensors, for providing additional information about the system. The additional components may also include other devices, such as dampeners, degassers, bubble traps, and filters, for performing auxiliary functions within the system.

Methods for conditioning a filter assembly in accordance with one or more aspects of the invention may also be embodied in any of numerous ways. After a filter assembly has been installed in a conditioning system embodying the invention, the filter assembly may be conditioned according to any of these methods, and the system controller may be programmed according to the steps, and the sequences of steps, described for any of these methods.

One of many different examples of an embodiment of a conditioning method may include opening the inlet of the filter assembly, filling the upstream side of the filter medium within the filter assembly with purging liquid, and filling the filter medium and the downstream side of the filter medium within the filter assembly with purging liquid. For many embodiments, opening the inlet of the filter assembly may include opening the inlet valve 33, e.g., at the direction of the controller 36. Alternatively the inlet valve may be opened manually.

The filter assembly, e.g., the upstream side of the filter medium, the filter medium itself, and the downstream side of the filter medium, may be filled with purging liquid, e.g., a solvent as previously described, in any of numerous ways. For example, the purging liquid supply may include a pressure source that forces purging liquid from the purging liquid container at a positive pressure (gauge), i.e., a pressure greater than atmospheric pressure. Filling the filter assembly may then include forcing purging liquid into the open inlet at a positive gauge pressure and into the upstream side of the filter medium, the filter medium itself, and the downstream side of the filter medium within the filter assembly. Alternatively or additionally, filling the filter assembly with purging liquid may include applying a vacuum, i.e., a pressure less than atmospheric pressure, to the outlet and/or the vent of the filter assembly and drawing purging liquid into the open inlet. Filling the filter assembly may then include drawing purging liquid into the open inlet at a pressure less than atmospheric pressure and passing the purging liquid along the upstream side of the filter medium, through the filter medium itself; and along the downstream side of the filter medium within the filter assembly. Filling the filter assembly may include first filling the upstream side of the filter medium with purging liquid and then filling the filter medium and the downstream side of the filter medium. Alternatively, the upstream side of the filter medium, the filter medium, and the downstream side of the filter medium may be filled with purging liquid all at the same time. Further, filling the filter assembly may also include flushing purging liquid through the filter assembly and out of the filter assembly through an open outlet and a closed vent, through a closed outlet and an open vent, or through an open outlet and an open vent. For example, the vent valve may be opened, either manually or at the direction of the controller, and purging liquid may be flushed through the open inlet along the upstream side of the filter medium within the filter assembly through the open vent to the waste reservoir. As purging liquid passes along the upstream side of the filter medium, it displaces any gas and flushes contaminants, including particulates or other substances shed or leached from the housing or filter medium, through the open vent to the waste reservoir, e.g., the vent waste reservoir.

For filter media that present a lower resistance to purging liquid flow, the purging liquid may concurrently pass through the filter medium, along the downstream side of the filter medium, through the open outlet to the waste reservoir, e.g., the outlet waste reservoir, while the vent is open and purging liquid is passing along the upstream side of the filter medium. For many embodiments, however, the filter medium may present a higher resistance to purging liquid flow. Then, the vent may be closed, e.g., manually or at the direction of the controller, after the purging liquid has sufficiently displaced and/or flushed gas and other contaminants from the upstream side of the filter medium within the filter assembly. With the vent closed, the purging liquid subsequently passes through the open inlet, through the filter medium, filling all of the pores and voids of the filter medium, along the downstream side the of the filter medium, through the open outlet to the waste reservoir, e.g., the outlet waste reservoir. Again, as purging liquid passes through the filter medium and along the downstream side the of the filter medium, it displaces any gas and flushes contaminants, including particulates and other substances shed or leached from the housing or filter medium, through the open outlet to the waste reservoir.

The flow rate of purging liquid along the upstream side of the filter medium, through the filter medium and/or along the downstream side the of the filter medium may vary depending on many factors, including the size of the filter assembly, the nature of the filter medium, e.g., the pore size of the filter medium, and the flow characteristics, e.g., the viscosity, of the purging liquid. Generally, the purging liquid passes at a flow rate 1) that provides a non-turbulent flow profile to inhibit any mixing of gas with the purging liquid, 2) that enables the purging liquid to flow to the bottom of the housing and rise along the upstream side of the filter medium in a manner that displaces gas and other contaminants ahead of the rising purging liquid, 3) that enables the purging liquid to thoroughly fill the filter medium and diffuse into all of the pores and voids of the filter medium, displacing all of the gas from the filter medium that might otherwise remain trapped in the filter medium, and/or 4) that enables the purging liquid to fill the interior along the downstream side of the filter medium from the bottom up in a manner that displaces gas and other contaminants ahead of the rising purging liquid. For many embodiments, including embodiments intended for the microelectronics industry, the flow rate of purging liquid through the open inlet may be in the range from about 3 mL/min or less to about 300 mL/min or more, and the total volume of purging liquid flushed through the open inlet may be in the range from about 300 mL or less to about 8000 mL or more.

The embodiment of FIG. 1 illustrates one of many different examples of conditioning methods embodying the invention. To fill the filter assembly 11, the inlet valve 33 and the vent valve 34 may be opened, e.g., at the direction of the controller 36. The controller 36 may then actuate the vacuum device 30 to generate a vacuum which may be applied to the open outlet 22 and the open vent 21 of the filter assembly 11, e.g., via the outlet line 32 and the vent line 31. For many embodiments, a vacuum in the range from about 0.04 MPa or less to about 0.1 MPa may be applied to the open outlet 22 and the open vent 21 to draw purging liquid into the open inlet 20. Purging liquid, e.g., a solvent as previously described, may then be drawn from the purging liquid supply 24 into the open inlet 20 of the filter assembly 11, e.g., via the inlet line 25. From the open inlet 20, purging liquid passes along the upstream side 14 of the filter medium 12 through the open vent and is directed to the vent waste reservoir 26a, e.g., via the vent line 31. The purging liquid flushes gas and other contaminants from the upstream side 14 of the filter medium 12 within the filter assembly 11, the contaminated purging liquid being deposited in the waste reservoir, e.g., the vent waste reservoir 26a. When the upstream side 14 of the filter medium 12 is substantially free of gas and other contaminants and filled with purging liquid, the vent valve 34 may be closed, e.g., at the direction of the controller 36, terminating flow through the vent 21 to the vent waste reservoir 26a.

After the vent valve 34 is closed, purging liquid continues to be drawn into the open inlet 20 from the purging liquid supply 24 due to vacuum applied to the open outlet 22 by the vacuum device 30. From the open inlet 22 the purging liquid passes through the filter medium 12 and along the downstream side 15 of the filter medium 12 within the filter assembly 11 through the open outlet 22, where it is directed to the outlet waste reservoir 26b, e.g., via the outlet line 32. The purging liquid flushes gas and other contaminants from the pores and voids of the filter medium 12 and the downstream side 15 of the filter medium 12, the contaminated purging liquid being deposited in the waste reservoir, e.g., the outlet waste reservoir 26b.

In addition to filling the filter assembly with purging liquid and flushing gas and other contaminants from the filter assembly, conditioning methods embodying the invention may further include closing the inlet of the filter assembly and applying a vacuum to at least the open outlet while the inlet is closed. The inlet of the filter assembly may be closed after the filter assembly, including the upstream side of the filter medium, the filter medium itself, and the downstream side of the filter medium, is substantially free of gas and other contaminants and is filled with purging liquid. For many embodiments closing the inlet of the filter assembly may include closing the inlet valve, e.g., at the direction of the controller. With the inlet valve closed, flow into the inlet of the filter assembly ceases and the filter assembly remains largely contaminant free and full of purging liquid.

The vacuum may be applied in a variety of ways to at least the open outlet of the filter assembly while the inlet is closed. For example, the vacuum may be applied to only the open outlet while both the inlet and the vent are closed. Alternatively, the vent valve may be opened, e.g., at the direction of the controller, and the vacuum may be applied to both the open outlet and the open vent while the inlet is closed. The vacuum serves to remove from the filter assembly any remaining gas particles or bubbles that may be trapped, for example, in the pores and voids of the filter medium or entrained in the purging liquid in the filter assembly. The strength of the vacuum may depend on several factors, including the size of the filter assembly, the nature, e.g., the pore size of the filter medium, and the flow characteristics, e.g., the viscosity, of the purging liquid. For many embodiments, a vacuum in the range from about 0.05 MPa or less to about 0.09 MPa or more may be applied to at least the open outlet. Further, the vacuum may be applied to the open outlet for up to about 5 hours or more or up to about 2 hours or more. For many embodiments, especially embodiments for use in the microelectronics industry where the filter assemblies are small, the vacuum may be applied for about 1 hour or less to remove any remaining gas from the filter assembly.

The embodiment of FIG. 1 illustrates one of many examples of a conditioning method. The inlet 20 of the filter assembly 11 may be closed by closing the inlet valve 33, e.g., at the direction of the controller 36, when the filter assembly 11 is substantially free of gas and other contaminants. The vent valve 34 may be opened, e.g., at the direction of the controller 36, and the vacuum generated by the vacuum device 30 may be applied to at least the open outlet 22, e.g., both the open outlet 22 and the open vent 21 by means of the outlet line 32 and the vent line 31, respectively. The purging liquid in the filter assembly 11 may remain under the vacuum until any remaining gas particles are drawn from the filter assembly 11, e.g., for about 1 hour or less, quickly providing a contaminant-free filter assembly 11.

Once the filter assembly is free of all contaminants, the filter assembly may be removed from the conditioning system. The inlet, vent, and outlet may be sealed, allowing the filter assembly to be stored and/or shipped filled with purging liquid and free of contaminants. Alternatively or additionally, the purging liquid may be displaced from the filter assembly, for example, by the chemical to be filtered, and the filter assembly may be placed into service to filter the chemical.

Many conditioning methods which embody the invention also allow the waste purging liquid to be neatly and safely disposed of without harming the environment or service personnel. These conditioning methods may include conditioning a filter assembly by 1) passing purging liquid through an open inlet, along the upstream side of the filter medium through an open vent of the filter assembly to a waste reservoir and 2) passing purging liquid through an open inlet, through the filter medium, along the downstream side of the filter medium, through an open outlet of the filter assembly to a waste reservoir. The purging liquid may be passed through the filter assembly, e.g., along the upstream side of the filter medium, through the filter medium itself, and along the downstream side of the filter medium, in a great variety of ways, as previously described. For example, as shown in FIG. 1, the purging liquid may be drawn through an open inlet 20 into the filter assembly 11 by applying a vacuum to both an open outlet 22 and an open vent 21. After the purging liquid has flushed any contaminants from the filter assembly 11, the filter assembly 11 may be contaminant free and filled with purging liquid, while the contaminant-free waste purging liquid is contained in the waste reservoir, e.g., the vent waste reservoir 26a and the outlet waste reservoir 26b.

Conditioning methods embodying the invention may further comprise replacing the conditioned filter assembly with a second assembly having a similar inlet, outlet and vent, closing the inlet of the second assembly, and passing the purging liquid in the waste reservoir to the second assembly through at least one of an open outlet and an open inlet of the second assembly. The second assembly may be variously configured. For many embodiments, the second assembly may be a dummy filter assembly, i.e., a filter assembly virtually identical to the conditioned filter assembly but lacking a filter medium. The entire interior of the housing of the dummy filter assembly is thus available to contain the waste purging liquid deposited in the waste reservoir by one or more conditioned filter assemblies. Alternatively, the second assembly may be a second filter assembly which as a filter medium but is not intended to be used for filtration.

The conditioned filter assembly may be replaced with the second assembly in a variety of ways. For example, replacing the conditioned filter assembly with the second assembly may include individually removing the inlet, outlet, and vent of the conditioned filter assembly from the inlet line, outlet line, and vent line, respectively, and individually reattaching these lines to the inlet, outlet, and vent of the second assembly. Alternatively, the condition system may include a manifold that enables the inlet line, outlet line, and vent line to be collectively attached to and/or removed from the inlet, outlet, and vent of the filter assembly and the second assembly. Replacing the conditioned filter assembly with the second filter assembly may then include removing the conditioned filter assembly from the manifold and attaching the second assembly to the manifold.

The purging liquid may be passed from the waste reservoir to the second assembly in any of several ways. For example, the waste reservoir may be only a single reservoir, and the waste purging liquid may be passed to the second assembly device through only an open outlet, or only an open vent, or both an open outlet and an open vent. Alternatively, the waste reservoir may include a plurality of waste reservoirs coupled to one or both of the open outlet and open vent. Once the vent of the second assembly is closed, e.g., by closing the inlet valve at the direction of the controller, the waste purging liquid may be allowed to drain, e.g., by gravity, into the second assembly. For example, after the conditioned filter assembly has been replaced by the second assembly and the inlet of the second assembly has been closed, the vacuum device may be deactuated, e.g., at the direction of the controller, and the waste purging liquid may drain into the second assembly, e.g., via the outlet line and/or the vent line. Alternatively, the waste purging liquid may be forced from the waste reservoir into the second assembly. For example, the vacuum pump of the vacuum device may be reversed and a slight positive gauge pressure may be generated in the vacuum chamber, forcing waste purging liquid from the waste reservoir into the second assembly. With the waste purging liquid from one or more conditioned filter assemblies contained in the second assembly, the second assembly may be appropriately disposed of, e.g., incinerated, without exposing the environment or any service personnel to the hazards of the purging liquid.

The embodiment of FIG. 1 illustrates one of many different examples of conditioning methods embodying this aspect of the invention. A filter assembly 11 may be conditioned by drawing purging liquid into the open inlet 20 of the filter assembly 11 by the application of a vacuum to an open outlet 22 and an open vent 21, as previously described. The conditioned filter assembly 11 may be replaced, for example, by removing the conditioned filter assembly 11 from a manifold 37. The second assembly 11a may then be attached to the manifold 37, and the inlet 20 of the second assembly 11a may be closed by closing the inlet valve 33, e.g., at the direction of the controller 36. The controller 36 may also deactuate the vacuum device 30. The waste purging liquid in the vent waste reservoir 26a and the outlet waste reservoir 26b then drains along the outlet line 32 and the vent line 31 through the open outlet 22 and then open vent 21 into the second assembly 11a, where it is neatly and safely contained. The embodiment of FIG. 1 illustrates one of many different examples of conditioning methods embodying this aspect of the invention. A filter assembly 11 may be conditioned by drawing purging liquid into the open inlet 20 of the filter assembly 11 by the application of a vacuum to an open outlet 22 and an open vent 21, as previously described. The conditioned filter assembly 11 may be replaced, for example, by removing the conditioned filter assembly 11 from a manifold 37. The second assembly 11a may then be attached to the manifold 37, and the inlet 20 of the second assembly 11a may be closed by closing the inlet valve 33, e.g., at the direction of the controller 36. The controller 36 may also deactuate the vacuum device 30. The waste purging liquid in the vent waste reservoir 26a and the outlet waste reservoir 26b then drains along the outlet line 32 and the vent line 31 through the open outlet 22 and then open vent 21 into the second assembly 11a, where it is neatly and safely contained.

Although the invention has been disclosed in the embodiments previously described and illustrated, the invention is not limited to those embodiments. For instance, one or more features of an embodiment may be eliminated or modified, one or more features of one embodiment may be combined with one or more features of other embodiments, or embodiments with very different features may be envisioned without departing from the scope of the invention. For example, for some embodiments, a conditioning system may be a stand-alone unit separate and apart from any system for manufacturing or using the filter assembly. For other embodiments, a conditioning system may be a subsystem integrated with a filter manufacturing system or an end-user's system, such as a microelectronics dispense system. For some embodiments conditioning system and methods may prepare a filter assembly for storage or shipping; for other embodiments conditioning systems and methods may prepare a filter assembly for immediate use.

Figure 2:
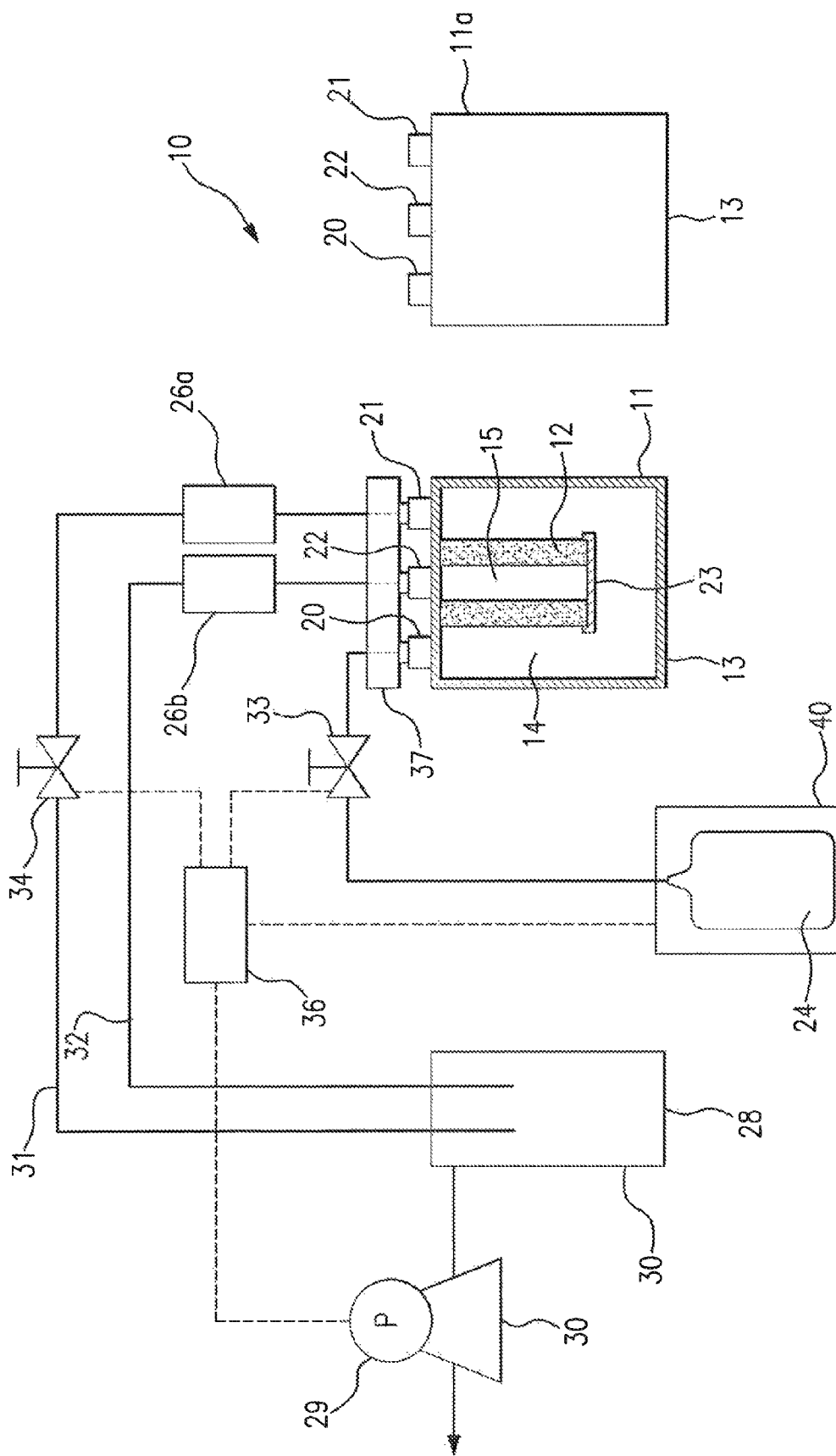
FIG. 2 is a schematic view of another embodiment of a system for conditioning a filter assembly.

A further embodiment of a conditioning system 10 and method is shown in FIG. 2. Many of the components of the conditioning system 10 of FIG. 2 are similar or identical to the components of the conditioning system of FIG. 1 and are identified by identical reference numerals. The conditioning system 10 of FIG. 2 may similarly comprise a purging liquid supply 24 coupled to the inlet 20 of a filter assembly 11 by an inlet line 25 and an inlet valve 33 connected to a controller 36. A waste reservoir including a vent waste reservoir 26a and an outlet waste reservoir 26b may be coupled to a vent 21 and an outlet 22 of the filter assembly 11 via a vent line 31 and an outlet line 32. A vacuum device 30 may also be connected to the vent 21 and the outlet 22 of the filter assembly 11 by the vent line 31 and outlet 32. A vent valve 34 may be connected in the vent line 31. In addition, the purging liquid supply 24 may include a pressure source 40 for applying pressure to the purging liquid container and forcing purging liquid into the open inlet 22 of the filter assembly 11 at a positive gauge pressure. For example, the purging liquid supply 24 may comprise a pneumatic expressor such as those available from ATMI under the trade designation NOWPak.

The method for conditioning the filter assembly of FIG. 2 may be analogous to the method for conditioning the filter assembly of FIG. 1. However, instead of drawing purging liquid into the open inlet of the filter assembly from the purging liquid supply, the purging liquid may be forced from the purging liquid supply 24 into the open inlet 20 at a positive gauge pressure. For example, the inlet valve 33 and the vent valve 34 may be opened at the direction of the controller 36. The pressure source 40 may be actuated by the controller 36 to exert pressure on the purging liquid container and force purging liquid from the purging liquid source 24 into the open inlet 20 of the filter assembly 11. The vacuum device 30 may be deactuated by controller 36 or may be actuated to apply a vacuum at the open vent 21 and assist the pressure source 40. The purging liquid enters the open inlet 22 at a positive gauge pressure and passes along the upstream side 14 of the filter medium 12 within the filter assembly 11 through the open vent 21 and into the waste reservoir, e.g., the vent waste reservoir 26a via the vent line 32. Gas and other contaminants may be flushed by the purging liquid from the filter assembly 11 through the open vent 21 into the vent waste reservoir 2a, leaving the upstream side 14 of the filter medium 12 largely free of contaminants and filled with purging liquid.

Next, the vent valve 34 may be closed at the direction of the controller 36. The pressure source 40 may continue to supply purging liquid to the open inlet 20 of the filter assembly 11 at a positive gauge pressure. Again, the vacuum device 30 may be deactuated by the controller 36 or actuated to provide a vacuum at the open outlet 22 and assist the pressure source 40. The purging liquid passes from the open inlet 20, through the filter medium 12, along the downstream side 15 of the filter medium 12 within the filter assembly 11 through the open outlet 22 and into the waste reservoir, e.g., the outlet waste reservoir 26b via the outlet line 32. Gas and other contaminants may be flushed by the purging liquid from the filter assembly 11 through the open outlet 22 into the outlet waste reservoir 26b, leaving the filter medium 12 and the downstream side 15 of the filter medium 12 largely free of contaminants and filled with purging liquid.

Conditioning methods embodying the invention may further comprise closing the inlet of the filter assembly and applying a vacuum to at least the open outlet, as previously described with respect to the conditioning method of FIG. 1. For example, the inlet 20 of the filter assembly 11 may be closed by closing the inlet vent 33, e.g., at the direction of the controller 36y. The controller 36 may also deactuate the pressure source 40 of the purging liquid supply 24. The vent valve 34 may be opened, e.g., by the controller 36, and the controller 36 may actuate the vacuum device 30. The vacuum generated by the vacuum device 30 may be applied to at least the open outlet 22, or both the open outlet 22 and the open vent 21 by means of the outlet line 32 and the vent line 31. The purging liquid in the filter assembly 11 may remain under vacuum until any remaining gas particles in the filter medium 12 or the purging liquid are drawn from the filter assembly 11 and the filter assembly 11 is contaminate-free, e.g., for about 1 hour or less.

The present invention thus encompasses innumerable embodiments and is not restricted to the particular embodiments that have been described, illustrated, and/or suggested herein. Rather, the present invention includes all embodiments and modifications that may fall within the scope of the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A system for conditioning a first filter assembly which includes a permeable filter medium having an upstream side and a downstream side, an inlet and a vent on the upstream side of the first filter assembly, and an outlet on the downstream side of the first filter assembly, the system comprising:

a purging liquid supply coupled to an inlet of the first filter assembly;

a vacuum device coupled to at least an outlet of the first filter assembly;

an inlet valve operable to open and close the inlet of the first filter assembly;

a vent valve operable to open and close the vent of the first filter assembly;

a waste reservoir coupleable to the vent and/or the outlet of the first filter assembly; and a controller connected to at least the vacuum device, the vent valve, and the inlet valve, wherein the controller operates to open the inlet valve and to open the vent and supply purging liquid from the purging liquid supply through the open inlet and along the upstream side of the filter medium within the first filter assembly and through the open vent, and to supply purging liquid to fill the upstream side of the filter medium, the filter medium and the downstream side of the filter medium within the first filter assembly with purging liquid, and the controller operates to supply purging liquid through the filter medium, along the downstream side of the filter medium and through the open outlet, and wherein the controller operates to close the inlet valve and actuate the vacuum device to apply a vacuum to an open outlet of the first filter assembly while the inlet is closed and while the first filter assembly is filled with purging liquid to provide a conditioned first filter assembly;

wherein the system further includes a second assembly having a second assembly inlet, a second assembly outlet and a second assembly vent, the second assembly being configured to replace the conditioned first filter assembly; wherein the controller is operable to close the second assembly inlet and allow purging liquid to drain from the waste reservoir through at least one of an open second assembly outlet and an open second assembly vent.

2. The system of claim 1 wherein drawing purging liquid through the open outlet or the open vent includes directing the purging liquid to the waste reservoir.

\* \* \* \* \*